(12) United States Patent
Yukawa et al.

(10) Patent No.: US 8,306,685 B2
(45) Date of Patent: Nov. 6, 2012

(54) ELECTRONIC LOGBOOK FLIGHT PREPARATION SYSTEM AND METHOD

(75) Inventors: Steven J. Yukawa, Seattle, WA (US); Rajit Jain, Seattle, WA (US); Tim W. Anstey, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1013 days.

(21) Appl. No.: 12/104,611

(22) Filed: Apr. 17, 2008

(65) Prior Publication Data

US 2009/0265056 A1 Oct. 22, 2009

(51) Int. Cl.
*G01M 17/00* (2006.01)
(52) U.S. Cl. .......................................................... 701/29
(58) Field of Classification Search .................. None
See application file for complete search history.

(56) References Cited

U.S. PATENT DOCUMENTS

| | | | |
|---|---|---|---|
| 7,756,145 B2* | 7/2010 | Kettering et al. | 370/401 |
| 7,788,002 B2* | 8/2010 | Yukawa et al. | 701/29 |
| 2007/0183435 A1* | 8/2007 | Kettering et al. | 370/401 |
| 2007/0219676 A1* | 9/2007 | Allen et al. | 701/3 |
| 2008/0046962 A1* | 2/2008 | Yukawa et al. | 726/1 |
| 2008/0052517 A1* | 2/2008 | Anstey et al. | 713/176 |

* cited by examiner

*Primary Examiner* — Thomas Tarcza
*Assistant Examiner* — Nagi Murshed
(74) *Attorney, Agent, or Firm* — Harness, Dickey & Pierce, P.L.C.

(57) ABSTRACT

A method for carrying out a logbook flight preparation process to present pre-flight information to a flight crew member of an aircraft prior to a flight mission. The method may involve electronically accessing a database to obtain a quantity of pre-flight information relating to an airworthiness of the aircraft, with the database being at least one of on-board the aircraft and remote from said aircraft. The quantity of pre-flight information is displayed in accordance with a desired sequence in which the information is to be presented to said flight crew member. The quantity of preflight information may be presented on a visual display in the desired sequence.

20 Claims, 2 Drawing Sheets

ELECTRONIC LOGBOOK FLIGHT PREPARATION SYSTEM AND METHOD

FIELD

The present disclosure relates to systems and methods that provide needed aircraft pre-flight information to a flight crew of an aircraft, and more particularly to a system and method that is able to present, in an orderly fashion, a large amount of detailed pre-flight information to the flight crew in a an orderly manner that is easy for the flight crew to comprehend and digest.

BACKGROUND

The statements in this section merely provide background information related to the present disclosure and may not constitute prior art.

With present day commercial aircraft, the flight crew must assess the technical status of the aircraft based on a collection and review of physically separate and/or generally unorganized information. Currently, pre-flight technical status information is typically spread out between paper logbooks (technical logs, cabin logs, deferred items logs), flight release and maintenance release paperwork (often dot-matrix printed paper tear-off reports), and flight plans provided by dispatch. From all of this information, the user, for example a pilot or co-pilot, must be able to identify current information relevant to the flight mission that he/she is about to perform. As will be appreciated, this can be challenging for the flight crew, especially in view of the plurality of different information sources (i.e., different log books and paper reports) that the flight crew is required to handle during the pre-flight review process.

Currently many maintenance history systems (ground based maintenance information systems) provide a "maintenance release" function which generates a maintenance release document, known in the industry as a "MRD". The MRD includes a summary of the technical status of the aircraft including servicing, deferred items and operating restrictions and maintenance actions since the last release of the aircraft. Often the flight crew is beginning the process of preparing for a flight prior to a MRD being created.

Once a paper MRD is created, subsequent review of the MRD does not necessarily ensure the validity of the report at the time of review. For example, in some instances defects may be detected and/or maintenance actions or servicing may be performed following creation of the MRD, rendering the paper report obsolete.

SUMMARY

In one aspect the present disclosure relates to a method for carrying out a logbook flight preparation process to present pre-flight information to a flight crew member of an aircraft prior to a flight mission. The method may comprise electronically accessing a database to obtain a quantity of pre-flight information relating to an airworthiness of said aircraft, with the database being at least one of on-board the aircraft or remote from the aircraft. The quantity of pre-flight information obtained from the database is organized in accordance with a desired sequence in which the information is to be presented to the flight crew member. The quantity of preflight information is then displayed on a visual display in the desired sequence.

In another aspect, a method is disclosed for carrying out a logbook flight preparation process to present pre-flight information to a flight crew member of an aircraft prior to a flight mission. The method may comprise, electronically accessing a database on-board the aircraft to electronically obtain a first quantity of pre-flight information relating to an airworthiness of the aircraft, wirelessly electronically accessing a database off-board the aircraft to obtain a second quantity of pre-flight information relating to airworthiness of the aircraft, and displaying said first and second quantities of preflight information on a visual display system in a desired order.

In still another aspect of the present disclosure, a system is disclosed for implementing a logbook flight preparation process to present pre-flight information to a flight crew member of an aircraft prior to a flight mission. The system may comprise, an electronically accessible database containing pre-flight information pertaining to at least two of open maintenance items for the aircraft, deferred maintenance items for the aircraft, operational restrictions on the aircraft; a fault history for the aircraft; and a Maintenance Release Document (MRD) for the aircraft; a processing subsystem for analyzing and organizing the pre-flight information obtained from the database, and a display responsive to the processing subsystem for displaying the pre-flight information in a sequence prepared by the processing subsystem.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
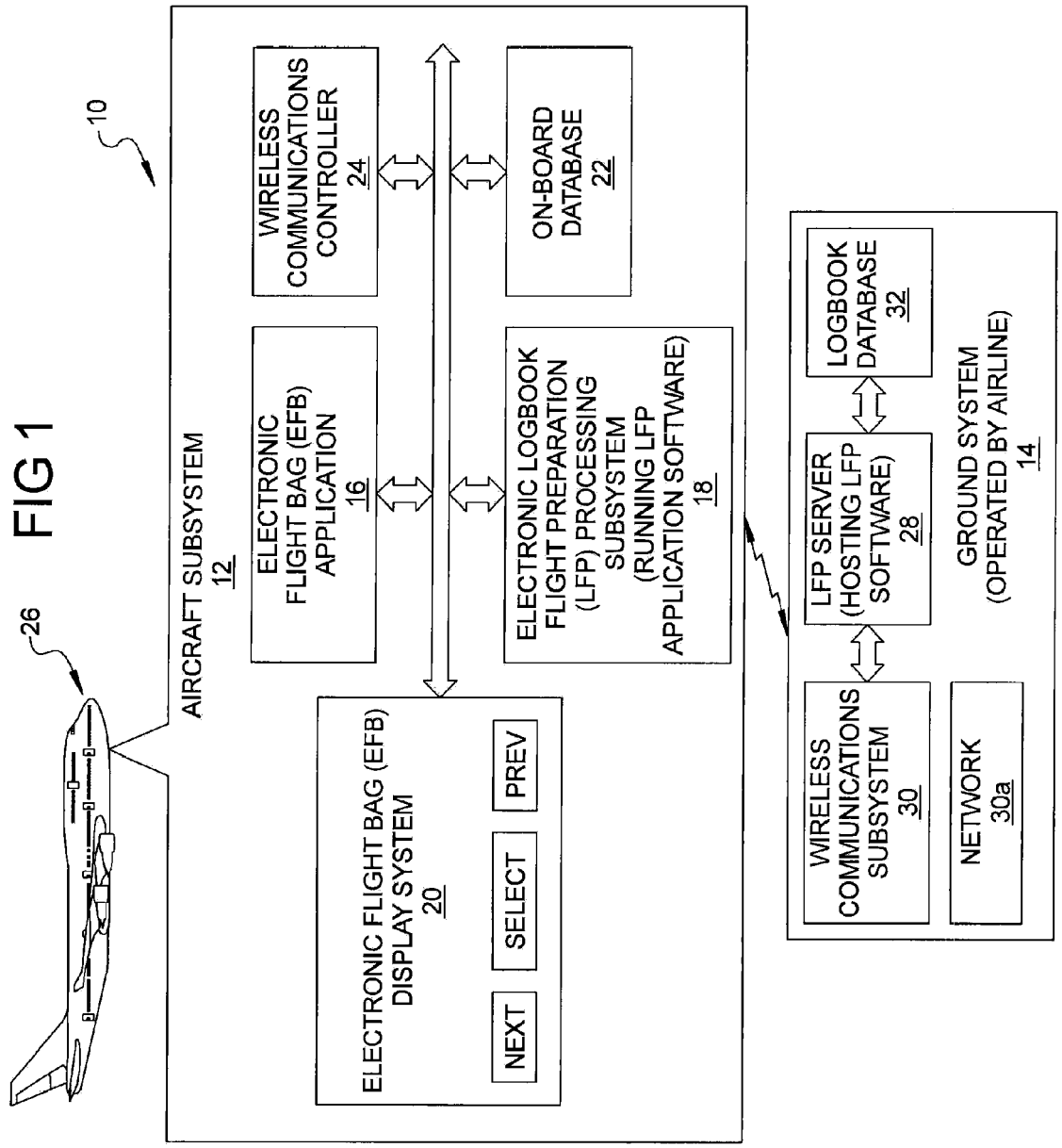
FIG. 1 is a block diagram of one embodiment of a system in accordance with the present disclosure.

Referring to FIG. 1, a system 10 is shown in accordance with one embodiment of the present disclosure. The system 10 is used to obtain, organize and present important pre-flight information relating to the airworthiness of an aircraft from a plurality of independent databases in a user configurable sequence. An important advantage of the system 10 is that by accessing various electronic databases, the most up-to-date pre-flight maintenance and fault information for the aircraft can be obtained and assessed by the flight crew in a timely manner.

In FIG. 1, the system 10 makes use of an aircraft subsystem 12 and a ground based subsystem 14. The aircraft subsystem 12 may include an Electronic Flight Bag (EFB) application 16, such as disclosed in co-pending U.S. patent applications "Multi-Network Aircraft Communication Systems and Methods" (Communication Management), application Ser. No. 11/303,647, filed 16 Dec. 2005; "Security Certificate Management", application Ser. No. 11/191,622, filed 28 Jul. 2005; and "Automated Integration of Fault Reporting", application Ser. No. 11/191,645, filed 28 Jul. 2005, all of which are owned by The Boeing Company, and all of which are hereby incorporated by reference into the present application.

An electronic logbook flight preparation (LFP) processing subsystem 18 may operate within the EFB application 16 or it may alternatively be a fully stand-alone application. An EFB display system 20, for example an LCD or CRT display, is in communication with the EFB 16 and the LFP processing subsystem 18. An on-board database 22 is accessible by both the EFB application 16 and the LFP processing subsystem. The on-board database may include fault history information, open maintenance items for the aircraft 26, including deferred maintenance items or any other pre-flight information that would be important for the flight crew to assess and fully understand before commencing a flight. A wireless communications controller 24 is used to wirelessly communicate, in this example via electromagnetic wave signals, with the ground based subsystem 14. The aircraft subsystem 12 is located on-board an aircraft 26. However, it will be appreciated that while an aircraft is illustrated, that the system 10 can be implemented with any other type of mobile platform such as a bus, train or other form of land vehicle, or a boat, ship or other type marine vessel. Thus, the system 10 is not limited to use only with aircraft.

The ground based subsystem 14 may include a logbook flight preparation (LFP) server 28 hosting the same LFP software application as the LFP processing subsystem 18. The LFP server 28 is in communication with the aircraft subsystem 12 via a wireless communications subsystem 30, and also with a database 32. Database 32 forms an "off-board" database that may include various types of flight preparation data and information such as fault history information, open maintenance items and/or deferred maintenance items, as well as a Maintenance Release Document (MRD). The database 32 may hold virtually any type of information that would be important to the flight crew to assess before beginning of a flight and is typically updated and maintained by the airline that is operating the aircraft 26. The precise types of information stored in databases 22 and 32 is configurable by the airline operating the aircraft 26. The databases 22 and 32 could also be maintained to store one or more of the same types of information, to thus form a backup in the event one of the databases 22 or 32 becomes temporarily inoperative. This feature could also possibly enhance the security of the system as well.

The aircraft subsystem 12 may communicate wirelessly with the wireless communications subsystem 30 via a network 30a. Network 30a may be a wide area network or a local area network. Wireless communications may also be via a cellular network.

Thus, it will be appreciated that the system 10 uses the LFP processing subsystem 18 to obtain, organize and present a wide variety of important airworthiness information to the flight crew, via the EFB display. Importantly, the LFP processing subsystem 18 obtains information electronically from both the on-board database 22 and the off-board (i.e., remotely located) database 32 at the ground based subsystem 14. Thus, the LFP processing subsystem 18 always has access to the most up-to-date airworthiness information. There is no need for the flight crew to manage the review of a plurality of paper-based flight records or paper-based logbooks, let alone the need to make sure that the most up-to-date paper records are being reviewed. A particular advantage is that since both databases 22 and 32 are in wireless electronic communication, the information needed to be assessed by the flight crew can be obtained in real time virtually instantly. There is no possibility of the flight crew having to wait for a particular paper-based logbook or paper-based report to be delivered to the flight deck of the aircraft while they are attempting to review all the pertinent airworthiness information about the aircraft, or of the flight crew inadvertently reviewing a paper-based document that is not the most up-to-date document in existence at the time.

Another significant advantage of the present system is that the airworthiness information can be tailored in its organization and presentation to the user by the airline that is operating the ground based system 14. For example, the airline may determine that a preferred sequence of displaying airworthiness information to the flight crew, via the EFB display 20, is that of 1) open maintenance items; 2) deferred maintenance items; 3) fault history and 4) a Maintenance Release Document (MRD). The ability of the system 10 to be configured to organize and present specific types of airworthiness information to the flight crew, in the precise order that the airline deems to be most efficient order, is a significant benefit.

Figure 2:
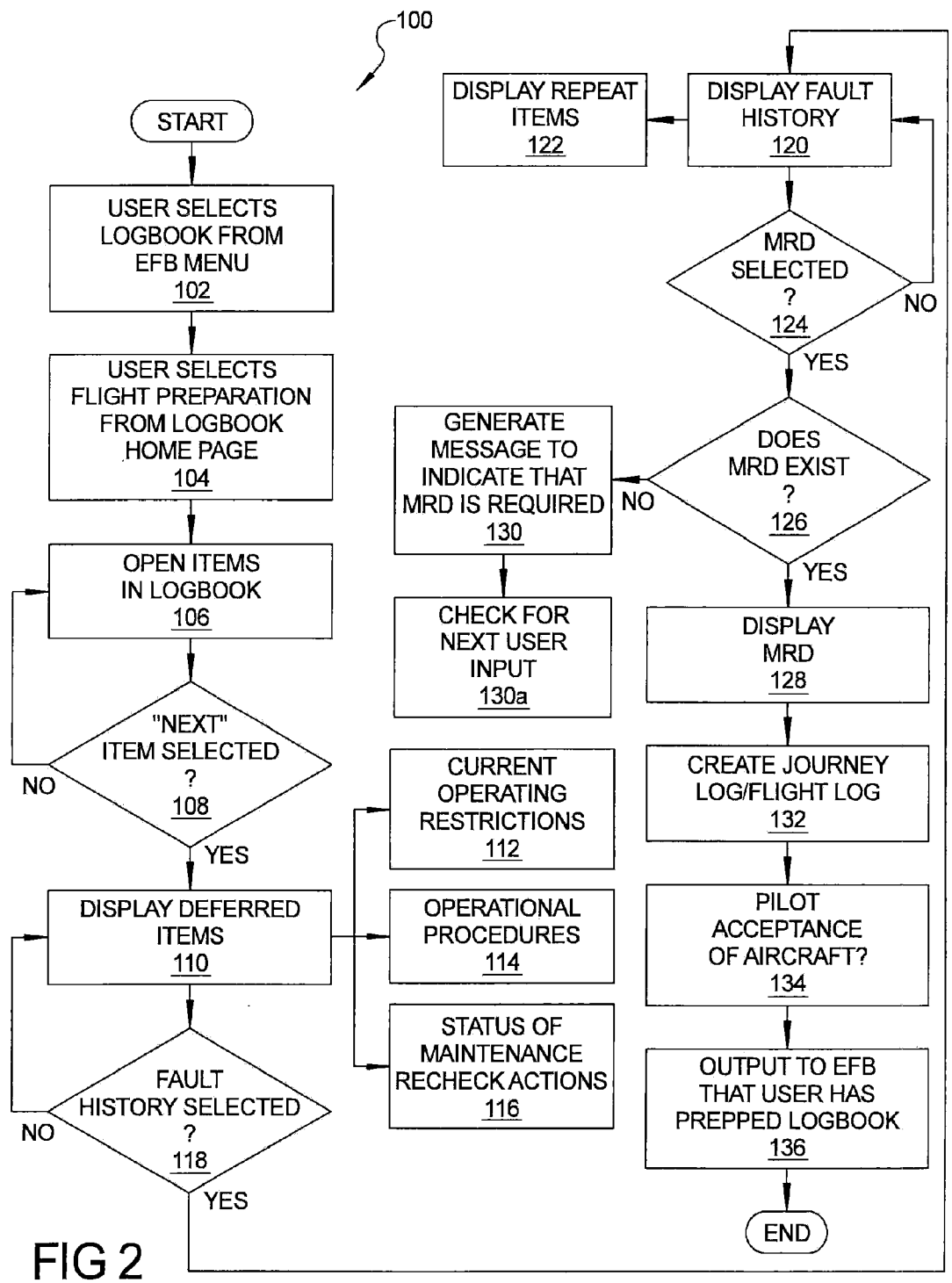
FIG. 2 is a flowchart illustrating an exemplary sequence of operations that the system and method of the present disclosure may carry out in implementing a logbook flight preparation operation.

Referring now to FIG. 2, a flowchart 100 is shown that more fully sets forth exemplary operations that the system 10 may carry out in organizing and displaying various types of airworthiness information. It will be appreciated, however, that the order of the operations discussed below could be altered into virtually any desired sequence, depending on the preferences of the airline using the system 10. Thus, the flowchart 100 should be understood as representing merely one sequence of operations that could be implemented by the system 10. The operations described in the flowchart 100 also assume that the system 10 is being used with the EFB application 16.

At operation 102, the user (flight crew member) selects from a main menu of the EFB display 20, either via a touch-screen or external keypad, the "Logbook" option. At operation 104, this causes the EFB display 20 to display the Logbook home page within the EFB application where a "Flight Preparation" option is displayed. At this point, the specific sequencing of information selected by the airline will be started. At operation 106, all open maintenance items in the Logbook will be displayed on the EFB display 20. These may comprise, for example, open technical faults and open non-technical items such as those relating to passenger convenience (e.g., the in-flight entertainment system) that need to be addressed, or given deferred status, before a MRD can be created.

At operation 108, a check may be made if the user has selected the "NEXT" button on the EFB display 20 or external keypad. If so, then the system 10 displays a listing of all the deferred maintenance items on the EFB display 20, as indicated at operation 110. These may also include additional information such an aggregate set of current operations restrictions for the aircraft 26, as indicated at operation 112, an aggregate set of operational procedures that the flight crew has to do in pre-flight preparation, as indicated at operation 114, and the status of all maintenance re-check actions including the type of maintenance re-check item, the date any such action was performed and its current status, as indicated at operation 116.

At this point, at operation 118 the system 10 may begin displaying a "Fault History" selection on the EFB display 20, and may begin to start checking to detect when the user selects this information, as indicated at operation 118. If the Fault History selection is selected by the user, at operation 120 the Fault History of the aircraft 26 may be displayed. An option the user has to display a set of repeat faults for the airplane. Any recurring fault items may be grouped together in the list so that the flight crew will easily be apprised of any such items. Optionally, a separate list of recurring fault items may be provided apart from a general listing of all fault items, as indicated at operation 122. Still further, the listing of fault items may be arranged and listed by date, such as all fault items that have occurred within the previous 14 days or previous 30 days. Alternatively, the fault items could be arranged by flight, such that all faults that occurred on a particular flight would be grouped together and separated from faults associated with other flights. An additional option is to allow the Fault History selection to display only airworthiness related faults. Still further, another option is to allow the Fault History selection to display all faults, including cabin passenger convenience items and in-flight entertainment related faults.

Once the fault history information is displayed on the EFB display 20, the system 10 may place a selection on the display 20 for selecting the "Maintenance Release Document" (MRD), and may begin checking to detect when the user has selected the MRD for display, as indicated at operation 124. When selected, the system 10 will check if a MRD has been created, as indicated at operation 126. If so, the MRD will be displayed on the EFB display 20, as indicated at operation 128. If no MRD exists yet, then the user may be prompted with a message on the EFB display 20 that a MRD needs to be created, as indicated at operation 130. The system 10 may then continue checking for the next user input from the EFB display 20 touchscreen options or from an external keypad, as indicated at operation 130a.

After confirming the status of the MRD, the flight crew member may be prompted with a screen having fields where the flight crew member may complete a "Journey Log" or "Flight Log", and the flight crew member may type in flight information for the flight that is about to be performed, as indicated at operation 132. Alternatively, this information could be automatically populated into the Journey Log or the Flight Log by the system 10. At operation 134, a dialog box may be presented on the EFB display 20 by the system 10 requesting that the flight crew member confirm or deny acceptance of the aircraft 26. If the aircraft is accepted, then an output may be generated to the EFB application 16 that the flight crew has prepped the flight logbook and accepted the aircraft for the next mission (i.e., the next flight), as indicated at operation 136. At this point the EFB application and the ground systems 16 will be aware that the flight crew has accepted the aircraft.

Again, it will be appreciated that the operations of presenting various forms of airworthiness information to the flight crew, as described in FIG. 2, may be arranged in virtually any order and thus the specific order selected is fully configurable. The ability of the system 10 to access and receive all of the pertinent airworthiness information for a given aircraft electronically makes the organization and presentation of such information highly customizable to suit the preferences of the airline operating the aircraft.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for carrying out a logbook flight preparation process to present pre-flight information to a flight crew member of an aircraft prior to a flight mission, the method comprising:
   enabling the flight crew member to electronically access a plurality of databases to obtain a quantity of pre-flight information relating to an airworthiness of said aircraft, said databases including:
      a first database on-board said aircraft, from which a first quantity of information is obtained for use by the flight crew member; and
      a second database remote from said aircraft and operated independently of said first database, from which a second quantity of information relating to additional aircraft airworthiness information for consideration by the flight crew member before commencing a flight, and which is different from said first quantity of information, the second database being accessible via a wireless link by the flight crew member;
   organizing said quantity of pre-flight information obtained from said databases in accordance with a desired sequence in which said information is to be presented to said flight crew member;
   displaying said quantity of preflight information on a visual display in said desired sequence; and
   writing information relating to airworthiness of said aircraft to at least one of said first and second databases.

2. The method of claim 1, wherein electronically accessing a plurality of databases comprises wirelessly accessing said second database, wherein said second database is located at a facility associated with an airline operating said aircraft.

3. The method of claim 1, wherein electronically accessing a plurality of databases to obtain a quantity of pre-flight information comprises obtaining information pertaining to open maintenance items for said aircraft.

4. The method of claim 1, wherein electronically accessing a plurality of databases to obtain a quantity of pre-flight information comprises obtaining information pertaining to deferred maintenance items for said aircraft from one of said databases.

5. The method of claim 1, wherein electronically accessing a plurality of databases to obtain a quantity of pre-flight information comprises obtaining information pertaining to a fault history for said aircraft from one of said databases.

6. The method of claim 5, further comprising aggregating recurring faults and displaying said aggregated recurring faults as a group on said display.

7. The method of claim 1, wherein electronically accessing a plurality of databases to obtain a quantity of pre-flight information comprises obtaining a Maintenance Release Document (MRD) for said aircraft from one of said databases.

8. The method of claim 1, further comprising displaying a screen on said display where said flight crew member can create a flight or journey log.

9. The method of claim 1, wherein electronically accessing a plurality of databases to obtain a quantity of pre-flight information comprises obtaining and aggregating operating restrictions for said aircraft from one of said databases, and displaying said aggregated operating restrictions as a group on said display.

10. The method of claim 1, wherein electronically accessing a plurality of databases to obtain a quantity of pre-flight information comprises obtaining and aggregating a status of all maintenance recheck items for said aircraft and displaying said aggregated status of maintenance recheck items as a group on said display.

11. The method of claim 1, wherein electronically accessing a database to obtain a quantity of pre-flight information comprises obtaining and aggregating operational procedures for said aircraft and displaying said aggregated operational procedures as a group on said display.

12. The method of claim 1, wherein said desired sequence is configurable.

13. A method for carrying out a logbook flight preparation process to present pre-flight information to a flight crew member of an aircraft prior to a flight mission, the method comprising:

enabling the flight crew member to electronically access a plurality of databases, wherein a first one of said databases is located on-board the aircraft, to electronically obtain a first quantity of pre-flight information relating to an airworthiness of said aircraft;

enabling the flight crew member to wirelessly electronically access a second one of the databases, which is maintained independently of said first one of said databases, wherein the second one of the databases is located off-board the aircraft to supply a second quantity of pre-flight information, which is different from said first quantity of pre-flight information, and which relates to airworthiness information to be considered by the flight crew member before commencing a flight of the aircraft; and displaying said first and second quantities of preflight information on a visual display system in a desired order according to a preference set by an entity operating the aircraft.

14. The method of claim 13, further comprising aggregating related types of said pre-flight information together as a group and displaying said group on said visual display system.

15. The method of claim 13, wherein said desired order is configurable by an entity operating said aircraft.

16. The method of claim 13, wherein obtaining said first and second quantities of pre-flight information comprises obtaining fault history information pertaining to said aircraft.

17. The method of claim 13, wherein obtaining said first and second quantities of pre-flight information comprises obtaining a Maintenance Release Document (MRD).

18. The method of claim 13, information obtaining information relating to said fault history further comprises organizing recurring faults as a group for display on said visual display system.

19. The method of claim 13, further comprising displaying a screen on said visual display system where said flight crew member can create a flight/journey log.

20. A system for implementing a logbook flight preparation process to present pre-flight information to a flight crew member of an aircraft prior to a flight mission, the system comprising:

a plurality of independently maintained, electronically accessible databases containing pre-flight information, a first one of the databases being located on-board the aircraft and a second one of the databases being located remote from the aircraft at a ground based facility and accessible via a wireless link from the aircraft, the first and second ones of the databases containing at least some different types of aircraft airworthiness information from one another, with the different types of the aircraft airworthiness information pertaining to at least two of:

open maintenance items for said aircraft;
deferred maintenance items for said aircraft;
operational restrictions on the aircraft;
a fault history for said aircraft;
a Maintenance Release Document (MRD) for said aircraft;

a processing subsystem for analyzing and organizing said pre-flight information obtained from said at least one of said first and second ones of said databases; and a display system responsive to said processing system for displaying said pre-flight information in a sequence prepared by said processing subsystem.

* * * * *